United States Patent [19]

Murray

[11] Patent Number: 4,796,518

[45] Date of Patent: Jan. 10, 1989

[54] ARTICULATED AIR VANE ARRANGEMENT

[75] Inventor: Patrick M. Murray, Waterford Township/ County, Mich.

[73] Assignee: General Motors Corporation, Detroit, Mich.

[21] Appl. No.: 196,860

[22] Filed: May 20, 1988

Related U.S. Application Data

[63] Continuation of Ser. No. 129,190, Dec. 7, 1987, abandoned.

[51] Int. Cl.[4] ............................................. B60H 1/34
[52] U.S. Cl. ......................................... 98/2; 98/40.26; 98/40.27
[58] Field of Search ................... 98/2, 40.26, 40.27, 98/110

[56] References Cited

U.S. PATENT DOCUMENTS

| | | |
|---|---|---|
| 2,632,375 | 3/1953 | Stair . |
| 2,735,351 | 2/1956 | Abrahamsen . |
| 2,887,943 | 5/1959 | Goettl ................................ 98/110 |
| 2,920,549 | 1/1960 | Freitag et al. .................... 98/40.26 |
| 2,940,375 | 6/1960 | Schucker et al. ................. 98/40.26 |
| 2,959,117 | 11/1960 | Wright et al. .................... 98/40.26 |
| 3,552,245 | 1/1971 | Armstrong ........................... 98/110 |
| 3,736,858 | 6/1973 | Mercier . |
| 4,665,804 | 5/1987 | Miyasaka ...................... 98/40.27 X |

FOREIGN PATENT DOCUMENTS

| | | | |
|---|---|---|---|
| 2814191 | 10/1979 | Fed. Rep. of Germany ..... 98/40.27 |
| 65534 | 4/1982 | Japan ........................................ 98/2 |

Primary Examiner—Harold Joyce
Attorney, Agent, or Firm—R. L. Phillips

[57] ABSTRACT

An articulated air valve arrangement in an air outlet of a motor vehicle heating, air conditioning and ventilation system has two vanes mounted for pivotal movement at right angles relative to each other. A single operator is slidably mounted on and pivotal with one of the vanes and is operatively unidirectionally linked to the other vane so as to effect pivotal movement of the one vane independent of the other vane on pivotal movement of the operator and, alternatively, the operator effects pivotal movement of the other vane independent of the one vane on sliding movement of the operator.

2 Claims, 2 Drawing Sheets

ARTICULATED AIR VANE ARRANGEMENT

This is a continuation of application Ser. No. 129,190, filed on Dec. 7, 1987, now abandoned.

TECHNICAL FIELD

This invention relates to articulated air vane arrangements and more particularly to operators therefor.

BACKGROUND OF THE INVENTION

In air distribution systems such as the heating, cooling and ventilating systems used in motor vehicle passenger compartments, there is generally provided horizontal and vertical articulated air vane arrangements in one or more of the air outlets that can be manually adjusted to give the air direction desired. Typically, these arrangements have one operator such as a knob or lever to control the horizontal vanes and another such operator to control the vertical vanes independently of the horizontal vanes.

SUMMARY OF THE INVENTION

The present invention is in a single operator that can perform the dual function of operating both the horizontal and vertical vanes independently of each other. According to the present invention, there is provided a simple readily manufacturable operator that is slidably mounted on and pivotal with one of the horizontal or vertical vanes and is operatively unidirectionally linked to one of the vanes in the other set. The vanes in each set are linked so as to pivot together and the single operator is operable to effect pivotal movement of the one vane and thereby the other vanes in its set on pivotal movement of the operator and to alternatively also effect pivotal movement of the one vane in the other set and thereby the other vanes in its set through the unidirectional linkage on sliding movement of the operator.

An object of the present invention is to provide a new and improved operator that singularly operates two otherwise unconnected pivotal air vanes.

Another object is to provide a simple readily manufacturable operator performing the dual function of operating two sets of vanes that are pivotable about different axes.

Another object is to provide an articulated air vane arrangement having an operator that is slidably mounted on and pivotal with one vane and operatively unidirectionally linked to another vane pivotal about another axis so as to effect pivotal movement of the one vane on pivotal movement of the operator and to alternatively also effect pivotal movement of the other vane on sliding movement of the operator.

These and other objects, features and advantages of the present invention will become more apparent from the following description and drawing in which:

DETAILED DESCRIPTION OF PREFERRED EMBODIMENTS

Figure 1:
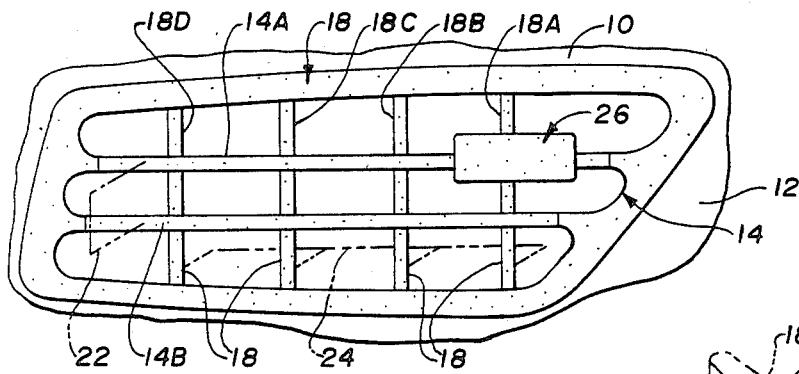
FIG. 1 is front elevational view of a motor vehicle heating, air conditioning and ventilation system air outlet with an articulated air vane arrangement therein according to the present invention.

Referring to FIG. 1, the air outlet comprises a frame 10 mounted in an instrument panel 12 located in the passenger compartment of a motor vehicle. Two parallel-arranged horizontal vanes 14A and 14B are pivotally mounted at their opposite ends in the frame 10 by a pivot pin 16 embedded in the longitudinal blunt-shaped passenger side edge 17 of each of the vanes (see FIG. 2). In addition, four parallel-arranged vertical vanes 18A, 18B, 18C and 18D (see FIG. 1) are pivotally mounted at their opposite ends in the frame and behind the horizontal vanes each in a notch 19 formed in the rear edge of the respective horizontal vane by a pivot pin 20 embedded longitudinally in each of the vertical vanes midwidth thereof as shown with respect to horizontal vane 14A and vertical vane 18A in FIG. 2. The horizontal vanes 14 are connected to pivot together about their respective horizontal axes by linkage 22 of any suitable conventional type such as parallel linked tie rods. Similarly, the vertical vanes 18 are linked to pivot together about their vertical axes by linkage 24 also of any suitable conventional type.

Figure 2:
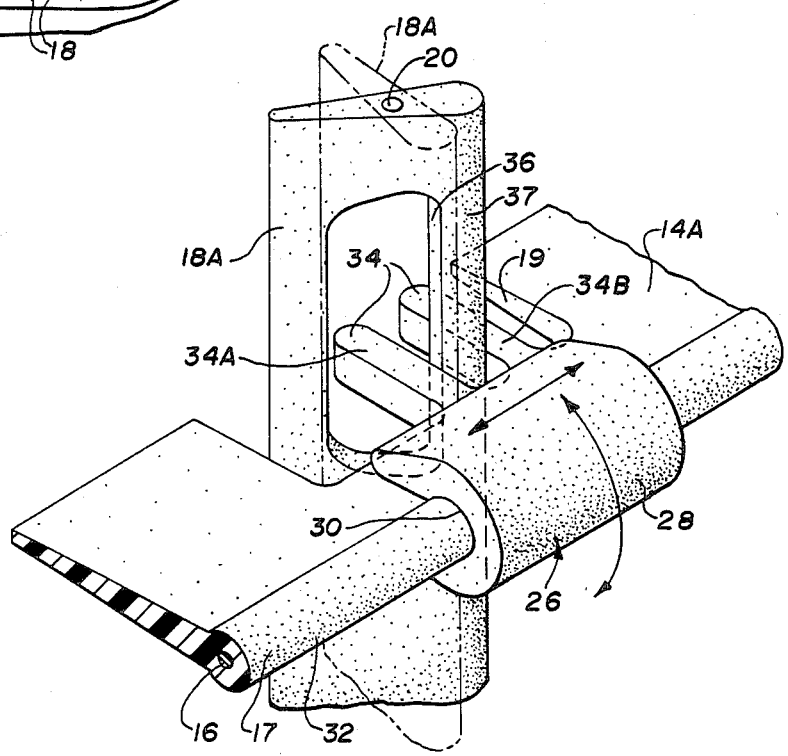
FIG. 2 is an enlarged three-dimensional view of the operator and interconnected horizontal vane and vertical vane in FIG. 1.

A single operator 26 operates both of the vane sets 14 and 18 independently of each other and as shown in FIG. 2 comprises an elongated cylindrically shaped body 28 having a semi-cylindrical bore 30 greater than 180° receiving a similar but convex surface 32 formed on the compartment side edge of the top one 14A of the horizontal vanes and by which the operator 26 is slidably mounted on this vane. A pair of parallel arranged arms 34 extend from the operator body 28 at right angles to the direction of sliding movement of the operator (the horizontal axis of horizontal vanes) and straddle the right hand one 18A of the vertical vanes. This one vertical vane 18A has its pivot pin 20 made in two pieces so that it can be formed with an opening 36 therethrough leaving only a longitudinal vertical vane section 37 forward of its pivot axis that is actually straddled by the operator arms 34 in the notch 19 of the one horizontal vane 14A and by its eccentric location serves as a crank to pivot the vertical vanes.

With the operator 26 thus mounted, it will be seen that a passenger can simply grasp same and by operating it as a lever tilt or pivot the one horizontal vane 14A in the directions shown by the arcuate arrow and conjointly pivot the other horizontal vane 14B through the linkage 22 either upward or downward about their respective pivot pins 16 from the flat position shown in FIG. 2. During such pivoting of the operator, its arms 34 pivot therewith but do not push sideways on while continuing to straddle the eccentric or crank portion 37 of the one vertical vane 18A so that the latter is not caused to pivot regardless of its position. Alternatively, the passenger may simply slide the operator 26 along the one horizontal vane 14A in the directions of the straight arrow in which case the horizontal vanes are not tilted but now one or the other of the arms 34 depending on the direction of operator movement is caused to engage the eccentric portion 37 of the one vertical vane 18A causing the latter to pivot in one or the other direction about its pivot pin 20 such as to the phantom line position shown and conjointly pivot the other vertical vanes 18B, 18C and 18D through the linkage 24. For example, as viewed in FIG. 2, the vertical vane 18A (and thereby the other vertical vanes) has been caused to pivot counterclockwise to the solid position shown by the left hand arm 34A pushing on the eccentric vane section 37 by rightward sliding movement of the operator 26 on the one horizontal vane 14A. Alternatively, by moving the operator 26 leftward, its other or right hand arm 34B will engage the forward vertical edge 37 of the one vertical vane 18A causing it to pivot clockwise to the phantom line position shown in this figure.

Figure 3:
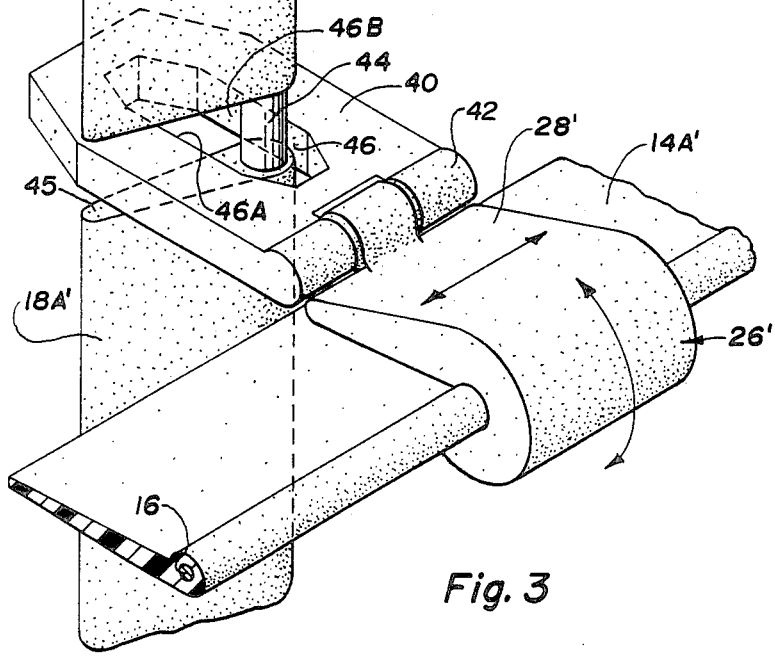
FIG. 3 is a view similar to FIG. 2 but of another embodiment of the operator and interconnected vanes according to the present invention.

Referring to the embodiment shown in FIG. 3 wherein parts similar to those previously described are identified by the same numbers only primed and significantly different and new parts are identified by new numbers, the operator 26' is mounted as before on the one horizontal vane 14A' but now there is a single arm 40 connected by a hinge arrangement 42 to the rear end of the operator body 28'. The vertical vanes are now located fully rearwardly of the horizontal vanes and the one directly operated vertical vane 18A' is segmented into two pieces that are secured in alignment by a crank pin 44 eccentric to the vane pivot 20' and leave a notch 45 in this vane rearward of the crank pin. The crank pin 44 is received in a slot 46 in the hinged arm 40 that is elongated at right angles to the horizontal hinge axis and is sufficiently large enough to receive the vertical vane therethrough for assembly therewith. And thus it will be appreciated that when the operator 26' is grasped and operated as a lever up and down, the horizontal vane 14A' is caused to pivot therewith while the hinged arm 40 then angulates with such pivoting within the notch 45 in the vertical vane 18A' while sliding along the crank pin 44 without causing movement of this vertical vane. On the other hand, when the operator 26 is slid horizontally on the horizontal vane 14A', one side or the other of the arm slot 46 engages the crank pin 44 causing the vertical vane to swing. For example, the left side 46A of the slot 46 has brought the vertical vane 18A' counterclockwise to the position shown in solid line by rightward sliding movement of the operator 26'. Alternatively, leftward sliding movement of the operator 26' will cause the opposite side 46B of the slot to engage the crank pin 44 and pivot the vertical vane clockwise such as to the phantom line position shown. And also like the previous embodiment, the unidirectional linkage between the operator and the one vertical vane and which in this embodiment is formed by the hinged arm with slot provides for independent control of the horizontal and vertical vanes regardless of their relative starting positions.

Figure 4:
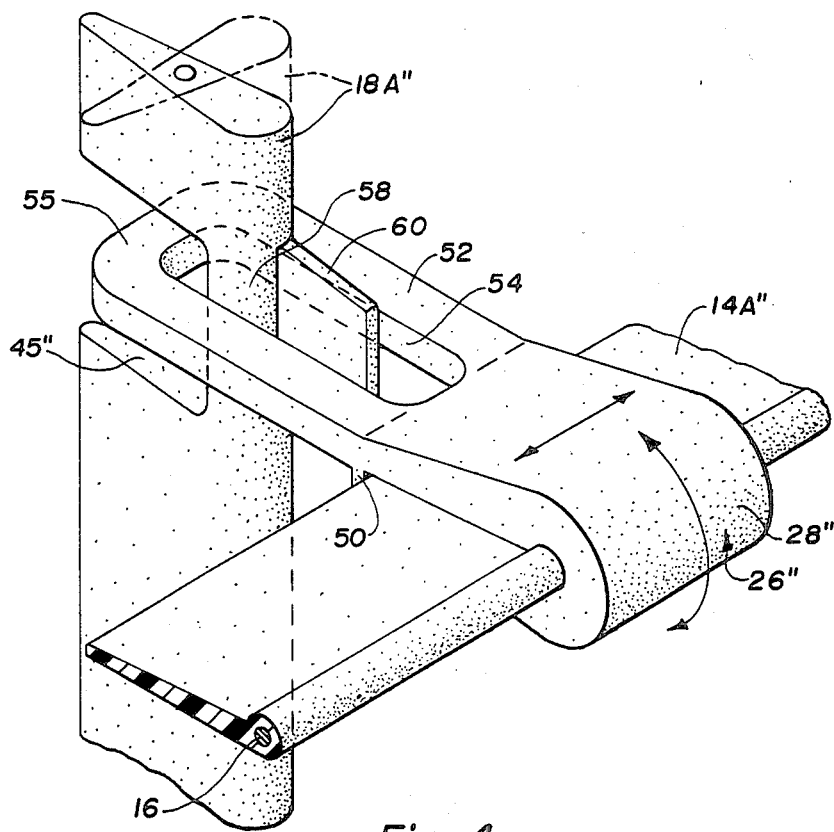
FIG. 4 is a view similar to FIG. 2 but of a third embodiment of the operator and interconnected vanes according to the present invention.

Referring now to the embodiment in FIG. 4 wherein parts similar to those previously described are identified by the same numbers only double primed and significantly different and new parts are identified by new numbers, the main body 28" of the operator 26" is mounted as before on one of the horizontal vanes 14A" and like the embodiment in FIG. 3, the vertical vanes are located behind the horizontal ones. For additional guidance, the body 28" is further formed with a rear rail 50 that guides on the rear edge of the horizontal vane. In addition, a single arm 52 is formed integral with the body 28" and extends rearward therefrom and has a slot 54 formed therein that is elongated in a direction at right angles to the pivot axis of the horizontal vanes. The slot 54 is large enough so that the arm 52 can receive the one vertical vane whereafter the rear end 55 of the arm is received fully within the notch 45" formed in the rear edge of the one vertical vane 18A". The slot 54 receives both the remaining forward portion 58 of the vertical vane forward of its axis and also a leverage adding rectangular shaped arm 60 now joined to the front edge of the vertical vane at its crank section. Thus it will be appreciated that upon the passenger grasping the operator 26" and operating it as a lever, the horizontal vanes will be caused to pivot therewith as before while the arm 52 on the operator swings upwardly and downwardly relative to the leverage arm 60 and forward crank section 58 of the vertical vane and freely within the notch 45" and thus without interference from or causing movement of the vertical vanes. On the other hand, when the operator 26" is moved leftward or rightward, one side or the other of the slot 54 engages the leverage arm 60 causing the vertical vane to pivot in one direction or the other and with greater leverage than by the previous embodiments.

Figure 5:
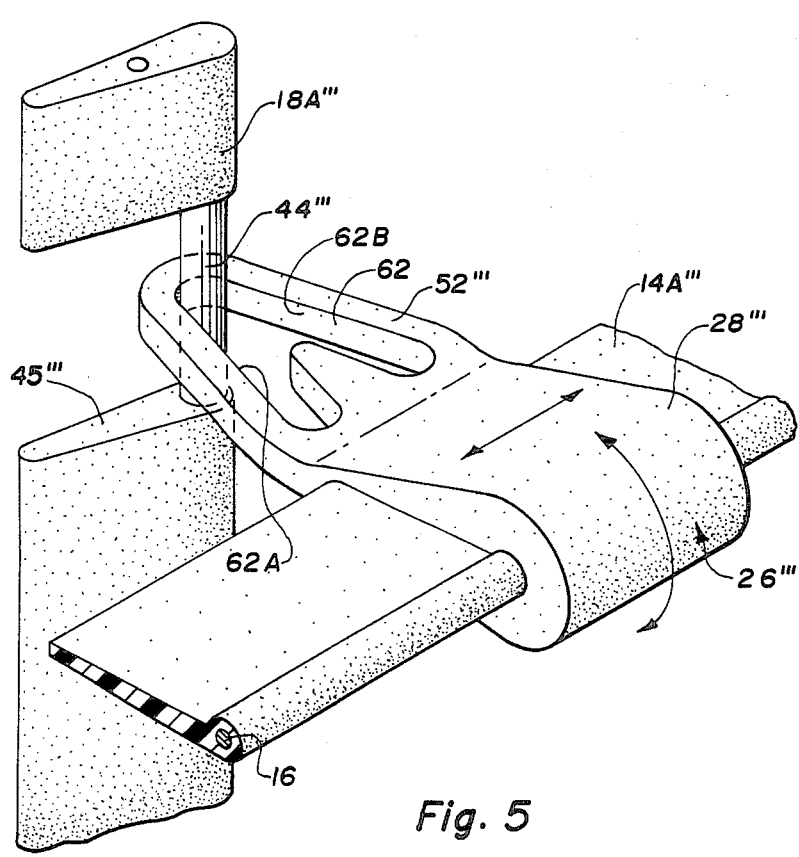
FIG. 5 is a view similar to FIG. 2 but of a fourth embodiment of the operator and interconnected vanes according to the present invention.

Referring finally to the embodiment shown in FIG. 5 wherein parts similar to those previously described are identified by the same numbers only triple primed and significantly different and new parts are identified by new numbers, the main body 28''' of the operator 26''' is mounted as before on one of the horizontal vanes 14A''' and the one vertical vane 18A''' is formed like that in FIG. 3 with a crank pin 44''' joining the two sections but leaving a wider notch 45''' in the rear edge. In this case, a single arm 52''' is again formed integral with the body 28''' like in the FIG. 4 embodiment but now with a V-shaped slot 62 formed therein symmetrical to a plane at right angles to the horizontal pivot axis and through which the vertical vane is received for assembly with the pin 44''' then located in such slot. The notch 45''' in this case is made larger than that in the FIG. 3 embodiment so that with the integral arm 52''' rather than a hinged arm, pivoting of the operator 26'''. as a lever up and down will cause pivoting of the horizontal vane without the integral arm contacting the opposite sides of the notch 45''' like in the FIG. 4 embodiment. On the other hand, when the operator 26''' is slid along the horizontal vane in either direction, one or the other of the two angled sides 62A and 62B of the slotted groove engage the crank pin 44''' causing the vertical vane to pivot as before but now establishing a closeout position at both extremes of such pivotal movement as determined by the crank pin 44''' reaching the bottom of the V of the slot 62 as seen at the extreme counterclockwise vertical vane position depicted in FIG. 5.

The foregoing description of the preferred embodiments of the invention have been presented for purposes of illustration and description. It is not intended to be exhaustive or to limit the invention to the precise forms disclosed as obvious modifications or variations are possible in light of the above teachings. For example, the operator could be mounted on either one of the two otherwise non-linked vanes that are pivotal about axes that are not orthogonal as shown but still, of course, not parallel. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. An articulated air vane arrangement comprising at least two vanes mounted for pivotal movement at substantially right angles relative to each other, operating means slidably mounted on and pivotal with one of said vanes for effecting pivotal movement of said one vane independent of said other vane on pivotal movement of said operating means, unidirectional linkage means including eccentric means on the other vane and arm means on said operating means operatively unidirectionally linking said operating means to said other vane for effecting pivotal movement of said other vane independent of said one vane on sliding movement of said operating means, an arm fixed on said operating means extending radially outward from the pivot axis of said one vane, said arm having an elongated slot receiving said eccentric means, and said eccentric means comprising a leverage arm fixed to said other vane and extending radially outward from the pivot axis of said other vane within said slot.

2. An articulated air vane arrangement comprising at least two vanes mounted for pivotal movement at substantially right angles relative to each other, operating means slidably mounted on and pivotal with one of said vanes for effecting pivotal movement of said one vane independent of said other vane on pivotal movement of said operating means, unidirectional linkage means including eccentric means on the other vane and arm means on said operating means operatively unidirectionally linking said operating means to said other vane for effecting pivotal movement of said other vane independent of said one vane on sliding movement of said operating means, an arm fixed on said operating means extending radially outward from the pivot axis of said one vane, said arm having an elongated slot receiving said eccentric means, and said slot having a V-shape.

* * * * *